Nov. 5, 1968   A. R. TRIPP   3,409,103
GAS-CUSHION VEHICLES
Filed May 4, 1966   4 Sheets-Sheet 1

INVENTOR
A. R. TRIPP
BY
Cameron, Kerkam & Sutton
ATTORNEYS

Nov. 5, 1968  A. R. TRIPP  3,409,103
GAS-CUSHION VEHICLES
Filed May 4, 1966  4 Sheets-Sheet 2
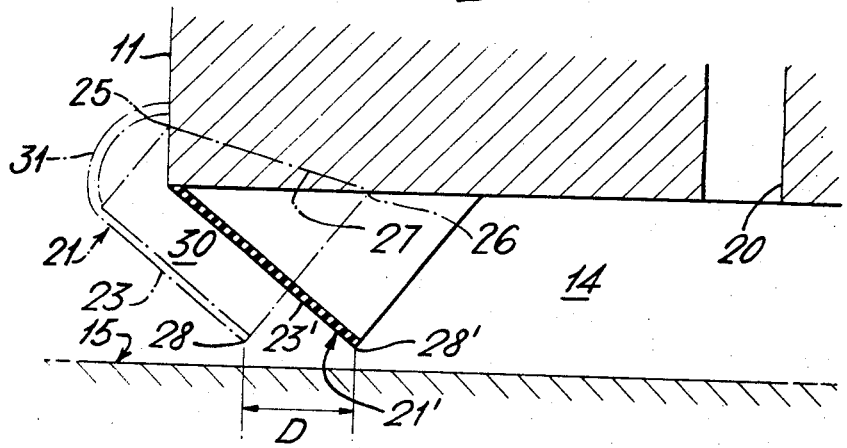
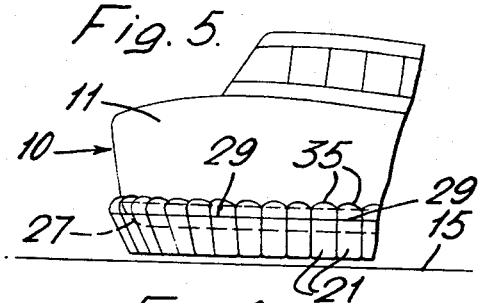
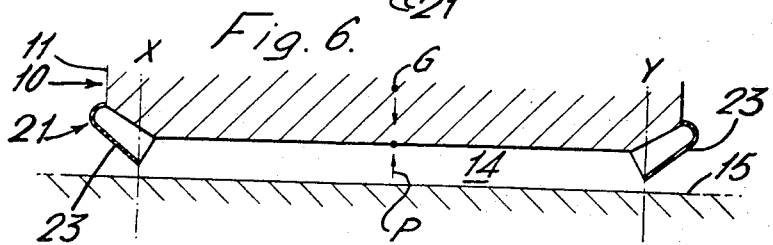
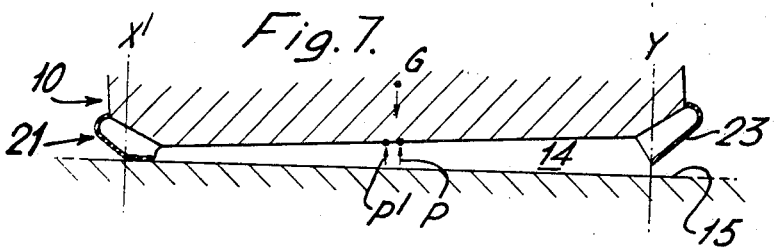
INVENTOR
A. R. TRIPP
BY
Cameron, Kerkam & Sutton
ATTORNEYS

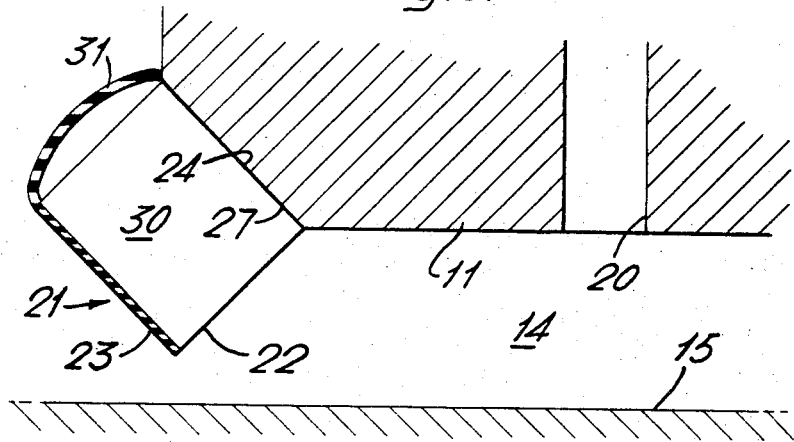
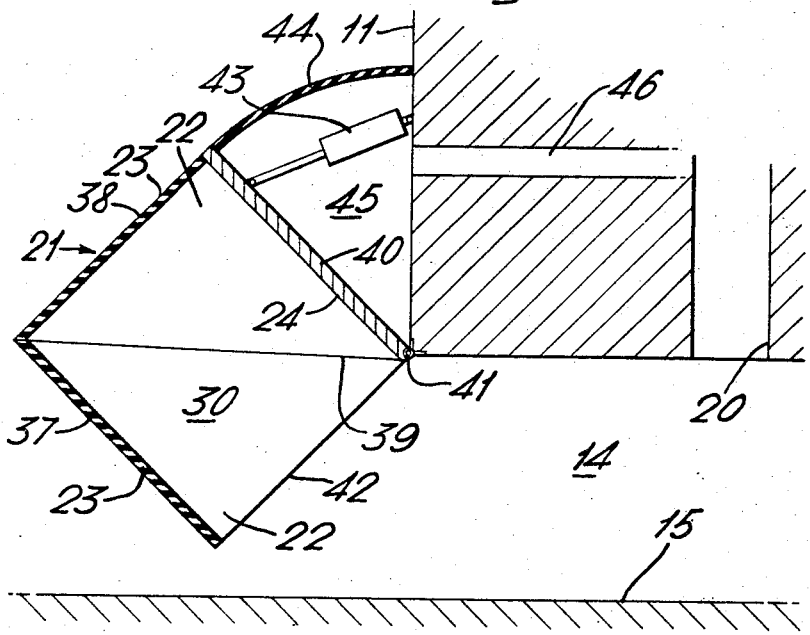

United States Patent Office 3,409,103
Patented Nov. 5, 1968

3,409,103
GAS-CUSHION VEHICLES
Alan Ritson Tripp, Gurnard, Cowes, Isle of Wight, England, assignor to Hovercraft Development Limited, London, England, a British company
Filed May 4, 1966, Ser. No. 547,514
Claims priority, application Great Britain, May 5, 1965, 19,057/65
8 Claims. (Cl. 180—127)

ABSTRACT OF THE DISCLOSURE

A flexible cushion-containing skirt for a gas-cushion vehicle comprises a row of inflatable wall elements of U-like lateral cross section, the limbs of each element extending inwardly towards the cushion and being attached by their ends to a peripheral part of the vehicle body which slopes upwardly and outwardly from the bottom of the body. The upper margins of the wall members are flexibly sealed to the vehicle body by caps or loops of flexible material.

---

Figure 1:
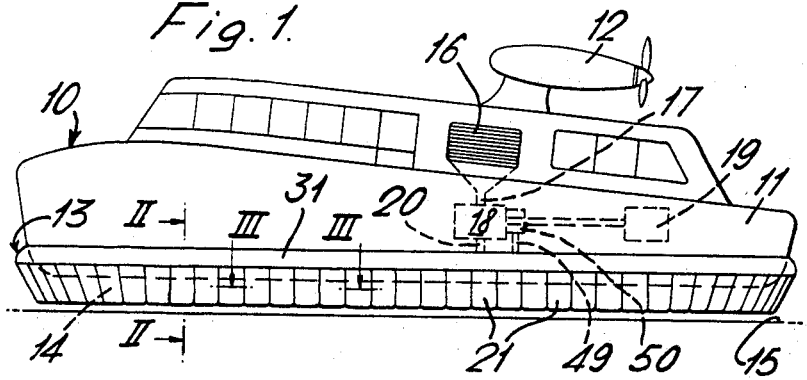

The present invention relates to gas cushion vehicles: that is to say, to vehicles for travelling over a surface and which, in operation, are supported above said surface, at least in part, by one or more cushions of pressurised gas.

This invention is concerned with vehicles of the type having a body and a flexible wall structure attached to the body for providing at least part of the lateral boundary of the gas cushion. In vehicles of this type, the flexibility of the wall structure enables the vehicle to pass over obstructions on the surface which project into the path of the wall structure, without the progress of the vehicle being substantially impeded, or the wall structure suffering any substantial damage.

It is desirable that the vehicle should maintain its attitude in a stable manner so that any tendency to pitch, for example, will be substantially reduced to prevent discomfort to the crew and passengers, and to eliminate the risk of contact between the vehicle body and the surface over which the vehicle is to travel.

Gas cushion vehicles are known from U.K. Patent No. 1,043,351 in which the lateral boundary of the gas cushion is provided by a wall structure comprising a succession of arch-shaped inflatable wall elements of flexible sheet material arranged side by side with the limbs of each element disposed in respective horizontally spaced-apart vertical planes inwardly of the arch of the wall element, the arch being inclined upwardly and outwardly from the lower margin of the element to the upper margin of the element, and the element being attached to the underside of the vehicle body by said upper margin. During operation, gas from the gas cushion is received in each element between the limbs thereof and inflates the limbs into co-operation with the adjacent limbs of neighbouring wall elements so that substantially no gas can escape between the wall elements outwardly from the gas cushion.

Gas from the gas cushion is received between the inclined arch of each wall element and the part of the vehicle body immediately above and sets up tension forces in the material of the arch having downward components which act equally and oppositely to the lift forces produced by the gas acting upwardly on the said part of the body: accordingly, the area of the body above the arches of the wall elements is not available to the gas cushion to produce vehicle-supporting forces.

It is desirable that the area of the vehicle body beneath which the vehicle supporting cushion or cushions exerts its supporting force should be large so that the pressure of the gas in the cushion can be kept small. The smaller the cushion pressure is, the less onerous will be the duty on the gas supplying apparatus, and the easier it will be to contain the gas of the cushion beneath the vehicle body.

According to the present invention, there is provided a gas cushion vehicle comprising a body, beneath which, in operation, a cushion of pressurised gas is formed, and a wall structure for providing at least part of the lateral boundary of the gas cushion, the wall structure comprising a succession of inflatable wall elements arranged side-by-side, each wall element being in the form of an arch-shaped piece of flexible sheet material, the limbs of which are disposed inwardly of the arch in respective horizontally spaced-apart vertical planes and attached to a rigid part associated with a peripheral region of the body at their inner extremities, the arch being outwardly spaced from the said rigid part and extending upwardly and outwardly from its lower margin, below the level of the body, to its upper margin, the wall elements each defining with the rigid member a space which is closed at the top by a cap portion attached to said upper margin and open at the bottom for receiving gas from the gas cushion, in operation, for inflating the wall elements so that the adjacent limbs of neighbouring wall elements are urged into co-operation to prevent any substantial lateral escape of gas from the gas cushion.

In the gas cushion vehicle according to the invention, the upward and outward inclination of the arches of the wall elements provide a substantial degree of attitude stability of the vehicle, while for given dimensions of the wall elements and the vehicle body, the spacing of the arch outwardly of the rigid part provides an increased area of the bottom of the vehicle body on which the gas cushion can act to support the vehicle.

The rigid part may provide a surface which slopes upwardly and outwardly from the bottom of the body, the wall elements being attached to said sloping surface, and the rigid part may be pivotally connected to the body for vertical pivoting movement so that the area of the vehicle on which, in operation, the gas cushion will produce vehicle-supporting forces may be varied.

A variable length jacking device may be connected between said rigid part and the body for regulating the vertical disposition of the member relative to the body, or alternatively, or additionally, the relative vertical disposition of the rigid part may be regulated by fluid received in a space defined by a membrane and the rigid part and the body.

Each wall element may be provided with a discrete cap portion, and the discrete cap portion may take the form of an inverted wall element, the margins of which are sealingly attached respectively to the first-named wall element and to the rigid part. Alternatively, the spaces defined between the rigid part and at least two elements may be upwardly bounded by a common cap portion.

There may be provided for each wall element a web of flexible sheet material which extends between the limbs of the element so as to define with the arch thereof a downwardly directed nozzle, whereby pressurised gas supplied to said nozzle will be downwardly discharged in the form of a curtain providing a lateral boundary to the gas cushion below the wall element.

Figure 2:
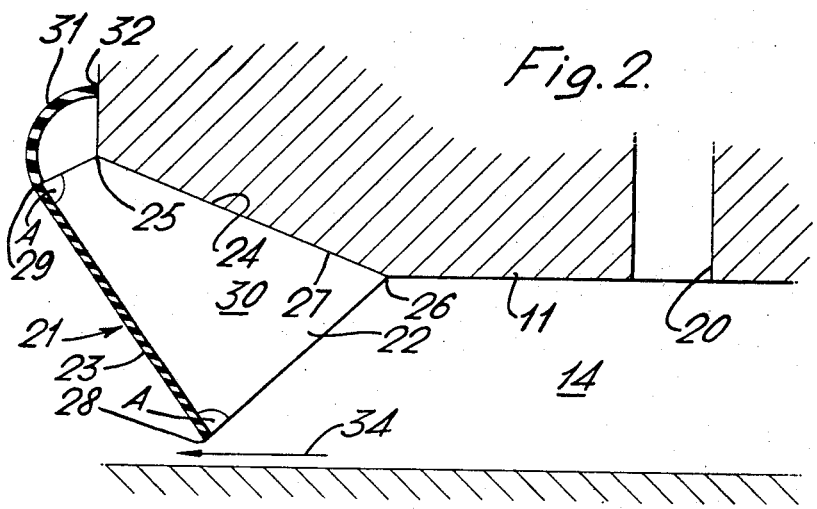
Figure 3:
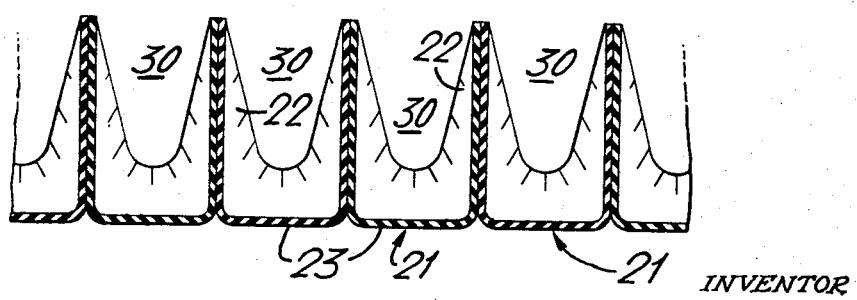
Figure 10:
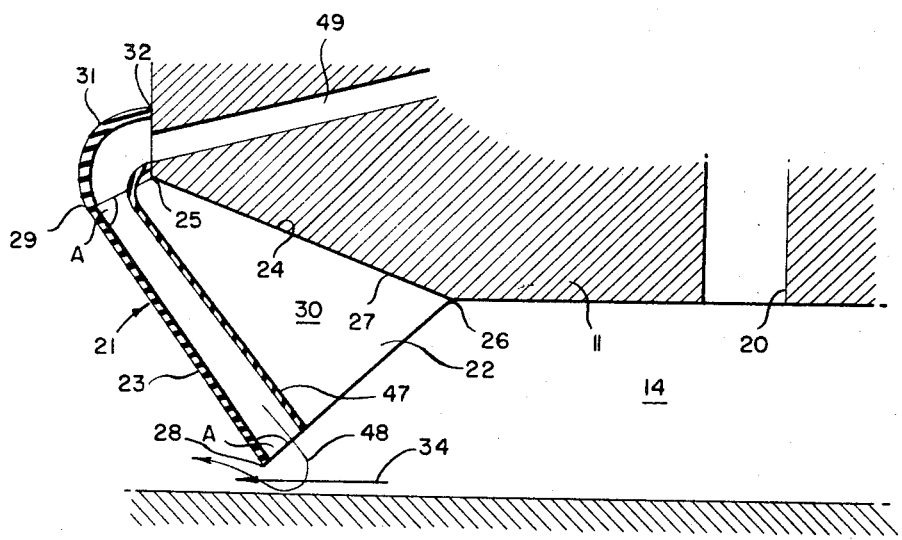

Embodiments of the invention will now be described, by way of example only, with reference to the accompanying drawings in which:

FIGURE 1 is a general view of a vehicle in accordance with the invention,

FIGURE 2 is a cross-sectional view of part of the vehicle of FIGURE 1 taken on line II—II, FIGURE 3 is a cross-sectional view of the vehicle of FIGURE 1, taken on line III—III, FIGURE 4 is a cross-sectional view corresponding to that of FIGURE 2 showing the comparison between previously known vehicles and vehicles in accordance with the invention, FIGURE 5 illustrates an arrangement alternative to that of FIGURE 1, FIGURES 6 and 7 schematically illustrate the manner in which the attitude of a vehicle in accordance with the invention is stabilised, FIGURE 8 is a cross-section corresponding to that of FIGURE 2 but showing another embodiment, FIGURE 9 is another cross-section corresponding to that of FIGURE 2 but showing a further embodiment, and FIGURE 10 is a cross-sectional view showing another modification of the embodiment of FIGURE 2.

In the drawings, corresponding parts have corresponding reference numerals.

In FIGURE 1, the vehicle, generally indicated by 10, is seen to comprise a body 11 on which is attached a propulsion unit 12, incorporating an air screw propeller. Attached to the body 11 is a flexible wall structure or skirt 13 which provides the lateral boundary of a space 14 beneath the body 11 in which a cushion of pressurised gas is formed, in operation, to support the vehicle 10 out of contact with the surface 15. The gas for the cushion in this instance is air which is induced through intakes 16 and ducts 17 by a fan 18, driven by a motor 19, and delivered to the cushion space 14 through one or more ducts 20.

Referring now to FIGURES 2 and 3, it will be seen that skirt 13 comprises a succession of bag-like inflatable wall elements 21 arranged side-by-side, each in the form of an arch-shaped piece of flexible sheet material arranged with the limbs 22 disposed inwardly of the arch 23 in respective horizontally spaced-apart vertical planes and attached to the body 11 by their inner edges 24 defined between their upper and lower extremities 25, 26 respectively. The region of the bottom periphery of the body 11 to which the wall elements 21 are attached has a rake or chamfer 27 which serves, during operation of the vehicle 10 over water, to downwardly deflect any waves which may strike the bottom peripheral region of the body 11 so that the body 11 will ride over these waves without being substantially impeded thereby.

The arch 23 of the wall element 21 is outwardly spaced from the chamfer 27 to which the wall element 21 is attached, and extends upwardly and outwardly from its lower margin 28, below the level of the body, to its upper margin 29 and the element 21 defines with the chamfer 27 a space 30 for receiving pressurised air from the cushion space 14.

The flexible sheet material may be of rubber, rubberised fabric or other relatively imprevious material.

The space 30 enclosed between each wall element 21 and the body 11 is closed at its uppermost end by a cap-portion 31 attached to the upper outer margin 29 of the wall element 21 and is downwardly open to the cushion space 14 at the bottom of the wall element 21. In this embodiment, the cap-portion 31 is a strip of flexible sheet material attached to the body 11 at 32 and sewn to the outer top margins 29 of the wall elements 21 so that substantially no air can escape therebetween. Pressurized air from intakes 16 arrives in the cushion space 14 through one or more of the ducts 20, and some of the air enters each element 21 through the open mouth defined by the lower margin 28 to inflate the elements 21. When inflated, the material of the elements is in tension and the adjacent limbs or side walls 22 of each element 21 are urged into co-operation with the limbs or side walls 22 of neighbouring elements 21 thereby to close the gaps between the elements 21, as shown in FIGURE 3, thereby to prevent any substantial lateral escape of pressurized air from the cushion space 14. The angles A between the upper and lower margins 28, 29 and the outermost part of the arch 23 of the wall elements 21 are preferably 90° so that tensile loads in the wall elements 21 can be carried back to the body 11 without wrinkling the material of the wall element 21.

The wall elements 21 may each be formed from a discrete piece of material as illustrated in FIGURE 3, or two or more adjacent wall elements may be formed from a common piece of material.

Air which is excessive to cushion maintenance requirements escapes under the wall structure 14 as shown by arrow 34.

If, during movement of the vehicle 10, the wall elements 21 should encounter an obstruction on the surface 15 or contact the surface 15 due to tilting of the vehicle 10, they will be crumpled as they ride over the obstruction or surface 15. However, because the side walls are attached to the body 11 at their upper and lower extremities 25, 26, the wall elements 21 are restrained against being pulled under the body 11 by the drag forces thus occasioned and hence, as soon as the contact with the obstruction or surface 15 has ceased, they will return to their uncrumpled configuration, as illustrated.

In FIGURE 4, the solid outlines represent the arrangement of a wall element 21' relative to the vehicle body 11 in accordance with U.K. Patent No. 1,043,351. The wall element 21' is located wholly under the vehicle body 11, and no part of the arch 23' thereof is spaced outboard of the part of the vehicle body 11 to which the wall element 21' is attached.

The dotted outlines represent the arrangement of a wall element 21 relative to the vehicle body 11 in accordance with the present invention. It will be seen that the arch 23 is spaced outboard of the part of the body 11 to which the wall element 21 is attached. The cap-portion 31 traps air from the cushion space 14 in the space 30 so that the wall element is inflated, and the vehicle body 11 has been cut away between the upper and lower extremities 25, 26 of the wall element 21, where it is attached to the body 11, to provide the chamfer 27, as shown in FIGURE 2.

It will be seen from FIGURE 4 that the lower margin 28 of the dotted-line wall element 21 is spaced a distance D outboard of the lower margin 28' of the solid line wall element 21'. Accordingly, it will be appreciated that the area of the vehicle body 11 on which the air cushion can provide vehicle supporting forces is increased by means of the arrangement according to the invention compared to the area available according to previously-known arrangements, for comparable dimensions of the wall elements 21 and vehicle body 11 employed. The pressure of the air cushion required for supporting the vehicle 10 is thus smaller, and a smaller and lighter-weight fan 18 and motor 19 (and the ducting 17, 20) may be employed, with further advantages as to the required cushion pressure and capital cost.

FIGURE 5 shows a side elevation of the forward end of a gas cushion vehicle 10 having an alternative arrangement to that of FIGURES 1 and 2 in which each wall element 21 is provided with a discrete cap-portion 35. The cap-portions 35 are each attached to the vehicle body 11, and sewn to the whole top margin 29 of the corresponding wall elements 21. Although this arrangement involves the use of more material and manufacturing time than the arrangement of FIGURES 1 and 2, it provides the advantage that a damaged wall element 21 and its cap-portion 35 can be removed and replaced as a unit without the need, as in the previous arrangement, to undo stitching between the cap-portion 31 and the wall element 21 and to restitch the cap-portion 31 to the new wall element 21 in situ on the vehicle 10.

The upward and outward slope of the arch 23 of the wall element 21 enables the attitude or trim of the vehicle 10 to be maintained substantially stable in a manner now to be described.

In FIGURE 6, the vehicle 10 is shown operating over surface 15 in its designed attitude. The supporting force of the air cushion in space 14 acts uniformly over the whole area of the bottom of the vehicle body 11 between the dotted vertical lines X and Y. Outside the lines X, Y, the pressure of the air acts upwardly on the body 11 and downwardly on the arch 23 of the wall elements 21 attached to the body 11, and the net effect is to set up tension forces in the material of the wall elements 21. The downward components of the tension forces exactly equal the upward forces provided the gas cushion acting on the parts of the body 11 outside lines X, Y. The position on the bottom of the body 11 of the centre of pressure of the gas cushion is indicated by P, and while the vehicle 10 is in its designed attitude, will be vertically below the position of the centre of gravity G of the vehicle 10.

In FIGURE 7, the vehicle 10 has tilted from the designed attitude of FIGURE 6. It will be seen that the innermost part of the wall element 21 on the lowered side of the vehicle 11 has contacted the surface 15 and crumpled thereagainst as far as vertical line X′ outboard of X. The pressure forces of the gas in the space enclosed by the wall element 21 still act upwardly on the bottom of the vehicle body 11 as previously, but since the innermost part of the arch 23 of wall element 21 on the lowered side of the vehicle 10 has crumpled against the surface 15, there are now no downwardly acting components of tension in wall element 21 inwardly of line X′. The area of the bottom of the body 11 on which the supporting forces of the cushion act is now defined between lines X′ and Y. The centre of pressure will act on the vehicle body 11 at point P′ on the side of the centre of gravity G which has tilted downwardly, and there will thus be provided a useful couple acting clockwise, as seen as FIGURE 7, acting to return the vehicle 10 to its designed attitude.

It will be appreciated that the attitude of the vehicle 10 is thus stabilised more or less automatically, and that substantially the whole of the bottom of the body 11 is available to the supporting cushion.

In FIGURE 8, the bag-like wall element 21 is substantially rectangular in elevation or vertical cross-section (as opposed to the tapezium form in FIGURE 2), and comprises an arch-shaped piece of flexible sheet material, the limbs or side walls 22 thereof being inwardly disposed of the arch 23 and attached to a chamfer 27 at the bottom of the vehicle body 11 by their inner edges 24 and cap-portion 31 of flexible sheet material is provided which closes the upper, outer end of the space 30 between the side walls 22 while the lower end of the space 30 is open to the cushion space 14. It will be appreciated that for a given thickness of the air cushion below the body 11 and a given upward and outward slope of the arch 23 of the wall elements 21 in FIGURE 2 and in FIGURE 8, the chamfer 27 in the FIGURE 2 arrangement will have a shallower angle than the chamfer 27 of FIGURE 8. Since the shallower angle of the FIGURE 2 arrangement will allow the vehicle body 11 to ride or plane over high waves which strike it with greater ease than the bluffer angle of FIGURE 8, it is preferred in practice to adopt the arrangement of FIGURE 2 for the forward end of the vehicle 10 where the need to plane over waves is greatest. The steeper angle of the chamfer 27 in FIGURE 8 provides a greater area of the vehicle body 11 on which the air cushion can act, and since there is substantially no requirement for the sides and rear of the vehicle 10 to plane or ride over waves, the arrangement of FIGURE 8 is preferred at the sides and rear of the vehicle.

In the embodiment shown in FIGURE 9, the wall element 21 is formed from two triangular sheets 37, 38 of flexible fabric, such as rubber or rubberised textile, the triangular sheets 37, 38 having been folded to an arched-shape so that the limbs of each arched shape form horizontally spaced-apart side walls 22 of the element 21 and the side walls 22 of each sheet 37, 38 are disposed inwardly of the corresponding arches 23 and fastened to each other along margin line 39 that the wall element has the form of a bag of rectangularly cross-section. The adjacent edges of sheets 37 and 38 are arranged to overlap and attached to each other by a lace (not shown) which is threaded through eyelets in the sheets and drawn tightly to effect a substantially gas-tight seal; the cushion pressure then helps to urge the overlapping adjacent edges into sealing engagement with each other. Thus, should it be necessary to replace the lower sheet 37 because of damage thereto, the lace is unthreaded from the damaged lower sheet 37 and the new lower sheet is then attached. The wall element 21 is attached by the inner edges 24 of its limbs 22 to a rigid member 40 of metal or plywood which is pivoted for vertical movement relative to the body 11 at pin 41. There may be any desired number of wall elements 21 attached to the rigid member 40, and there may be one or more rigid members 40 along each side of the vehicle 10. The lower margin 42 of element 21 defines an opening to the space 30 within the element 21 and the upper outer end of the space is closed by the outer arch 23 of sheet 38, so that the element 21 is inflatable by pressurised air fed to the cushion space 14. When the elements 21 are inflated the side walls 22 of each element 21 cooperate with the side walls 22 of adjacent elements 21 in the manner shown in FIGURE 3 and thus close off any gaps between the elements 21, thereby to contain the gas cushion.

The disposition of the elements 21 relative to the body 11 is controlled by variable-length jacking device 43, which may be a hydraulic or screw-jack of known type, connected between the body 11 and the rigid member 40. When it is desired to raise or lower a number of elements 21 to change the position of the centre of pressure of the gas cushion relative to the body 11, the jacking device(s) 43 is operated appropriately. Thus by adjusting the jacking device 43, the trim of the vehicle may be adjusted—for example, the trim may be adjusted to allow for incorrect ballasting.

In this embodiment, the whole of the bottom of the body 11 is available to the air cushion. The pressure of the cushion may therefore be lower than in the previous embodiments to support the same vehicle body 11. If desired, a membrane 44 can close the space 45 in which the jacking devices 43 are located, and gas may be fed to the space 45 at varying pressures in order to supplement the action of the jacking devices 43. In a variant (not shown) of this embodiment, the jacking devices 43 may be dispensed with entirely and the pressure of gas in the space 45 used to regulate the disposition of the rigid member 40 and the elements 21. Any gas may be used here; conveniently pressurised air from the fan 18 of FIGURE 1 may be used, and supplied to the space via duct 46.

The invention is not limited to the embodiments described above, but also is applicable inter alia to vehicles of the type described in which the wall elements 21 are adapted to discharge a curtain of fluid downwardly to provide a lateral boundary for the gas cushion below the lowest point of each element. Suitable means for effecting such discharge are shown in FIGURE 10 wherein a web 47 of flexible material is provided which extends between the limbs 22, and which defines with the arch 23 and the limbs 22 a downwardly directed nozzle, the nozzle being supplied with a fluid at a pressure higher than cushion pressure in feed duct 20. The curtain of fluid is indicated by arrow 48. The fluids may be, for convenience, air, which is supplied to a feed duct 49 from a high pressure air pump 50, shown in dotted lines in FIGURE 1. It is contemplated that the fluid may alternatively by of liquid—conveniently water—or a mixture of liquid and gas, such as a foam or air-water spray.

Various combinations of the features described and illustrated may be employed without departing from the scope of the invention.

I claim:
1. A gas cushion vehicle comprising a body, beneath which, in operation over a surface, a cushion of pressur- ised gas is formed, the body having a rigid part associated with a peripheral region thereof and providing a surface which slopes upwardly and outwardly from the bottom of the body, and a wall structure for providing at least part of the lateral boundary of the gas cushion, the wall structure comprising a succession of inflatable wall elements arranged side-by-side, the wall elements each being in the form of an arch-shaped piece of flexible sheet material and having a closed end defined by the arch and limb extending away from said closed end, each wall element being arranged with its limbs disposed inwardly of the arch in respective horizontally spaced-apart vertical planes and attached to the sloping surface of said rigid part at their inner extremities, the arch being outwardly spaced from said rigid part and extending upwardly and outwardly from its lower margin, below the level of the body, to its upper margin, the arch of each wall element making an angle of substantially 90° with the lower edges of the limbs thereof, and the upper and lower edges of the limbs being of different lengths whereby the arch of each wall element is inclined to the surface over which the vehicle operates, each wall element defining with said rigid part a space, and a separately formed cap-portion of part-circular to form attached to said rigid part and to the upper margin only of the arch of each wall element and upwardly bounding said space, the space being open at the bottom for receiving gas from the gas cushion, in operation, for inflating the wall elements so that the adjacent limbs of neighbouring wall elements are urged into cooperation to prevent any substantial escape of gas from the gas cushion.

2. A vehicle according to claim 1 wherein said cap-portion comprises a plurality of discrete cap-portions, each wall element being provided with one of the discrete cap-portions.

3. A vehicle according to claim 2 wherein, each discrete cap-portion takes the form of an inverted wall element having its limbs disposed in respective spaced-apart vertical planes inwardly of the arch thereof and arranged with its uppermost margins attached in sealing-tight fashion to the rigid member and its lowermost margins attached in sealing-tight fashion to the upper margins of the first-named wall element.

4. A vehicle according to claim 1 wherein said cap-portion comprises a common cap-portion upwardly bounding the said spaces defined between the rigid part and at least two neighbouring wall elements.

5. A vehicle according to claim 1 including, for each wall element, a web of flexible sheet material which extends between the limbs of the element so as to define with the arch thereof a downwardly directed nozzle, whereby fluid supplied to said nozzle will be downwardly discharged in the form of a fluid curtain serving to provide a lateral boundary to the gas cushion below the said wall element.

6. A gas cushion vehicle comprising a body, beneath which, in operation, a cushion of pressurised gas is formed, the body having a rigid part associated with a peripheral region thereof and a wall structure for providing at least part of the lateral boundary of the gas cushion, the wall structure comprising a succession of inflatable wall elements arranged side-by-side, the wall elements each being in the form of an arch-shaped piece of flexible sheet material and having a closed end defined by the arch and limbs extending away from said closed end, each wall element being arranged with its limbs disposed inwardly of the arch in respective horizontally spaced-apart vertical planes and attached to said rigid part at their inner extremities, the arch being outwardly spaced from said rigid part and extending upwardly and outwardly from its lower margin, below the level of the body, to its upper margin, each wall element defining with said rigid part a space, and a cap-portion attached to said upper margin and upwardly bounding said space, the space being open at the bottom for receiving gas from the gas cushion, in operation, for inflating the wall elements so that adjacent limbs of neighbouring wall elements are urged into cooperation to prevent any substantial escape of gas from the gas cushion, said rigid part being pivotally connected to the body for vertical pivoting movements for varying the area of the vehicle on which the gas cushion will act, in operation, to produce vehicle-supporting forces.

7. A vehicle according to claim 6 including a variable length jacking device connected between said rigid part and the body for regulating the vertical disposition of said part relative to the body.

8. A vehicle according to claim 6 including a flexible membrane which defines with the body a space for receiving a fluid for regulating the vertical disposition of the said part relative to the body.

References Cited

UNITED STATES PATENTS 3,211,246   10/1965   Lewis.
3,291,240   12/1966   Driver.
3,321,039   5/1967   Watts.

A. HARRY LEVY, *Primary Examiner.*